United States Patent [19]
Smithmeyer

[11] 3,777,575
[45] Dec. 11, 1973

[54] STATIC BALANCER FOR AUTOMOTIVE AND OTHER SIMILAR WHEELS

[76] Inventor: Louis P. C. Smithmeyer, 12009 30th Ave. S.W., Seattle, Wash. 98146

[22] Filed: Apr. 3, 1972

[21] Appl. No.: 240,627

[52] U.S. Cl. .................................................. 73/483
[51] Int. Cl. .......................................... G01m 1/12
[58] Field of Search ...................... 73/483-486, 487

[56] References Cited
UNITED STATES PATENTS

| | | |
|---|---|---|
| 1,729,947 | 10/1929 | Lannen................................ 73/483 |
| 2,060,958 | 11/1936 | Taylor.................................. 73/483 |
| 2,587,402 | 2/1952 | Steel.................................... 73/480 |

*Primary Examiner*—James J. Gill
*Attorney*—John O. Graybeal et al.

[57] ABSTRACT

Centering points on a plate are inserted into the stud holes of a wheel from the inside of the wheel and the plate is locked onto the wheel. The wheel is rolled into a position adjacent a pedestal and is laid down on its side over the pedestal. A balancing rod carried by the plate is then lowered down onto the pedestal to raise the wheel into a position of support on the balancing rod.

5 Claims, 1 Drawing Figure

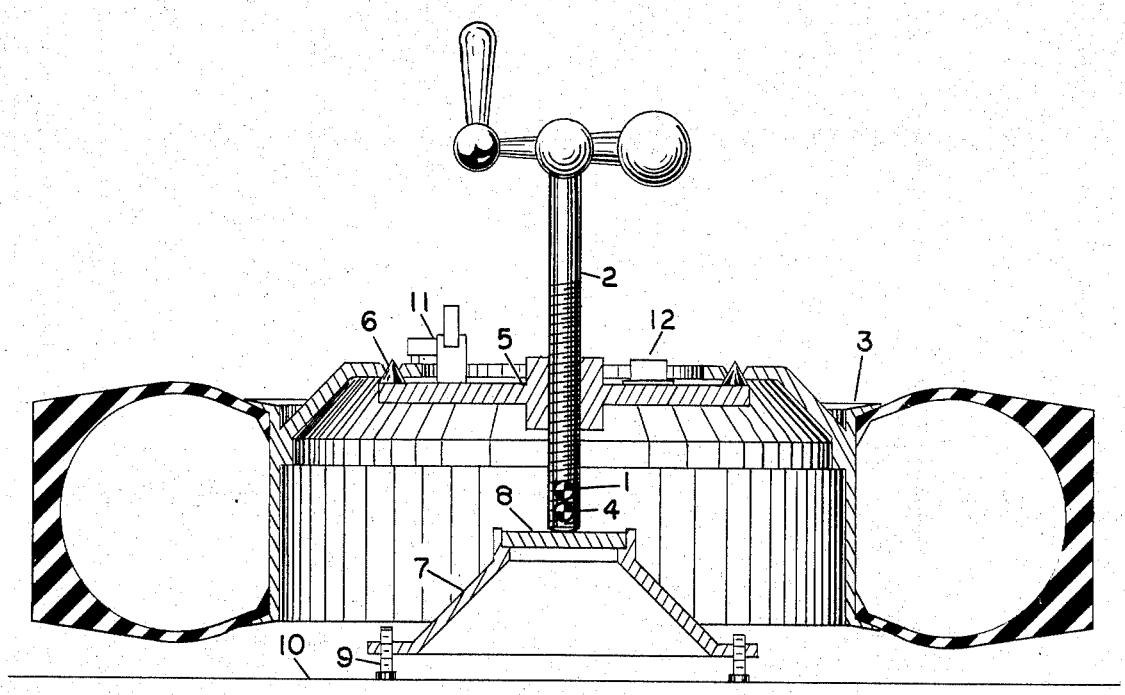

STATIC BALANCER FOR AUTOMOTIVE AND OTHER SIMILAR WHEELS

The purpose of the herein described invention is to enable the usual mechanic to quickly and easily staticly balance objects such as automotive wheels and tires and other similar objects with this light weight and simple portable device. The current highway driving speeds no longer allow the usual tire and wheel to be used in an unbalanced condition without vibration that may be of an amount harmful to the vehicle and contents and also increase tire wear and inability of the driver to properly control the vehicle.

DESCRIPTION

This device is based upon the known principle of an object, consisting of a fixed weight, supported upon a freely operating pivot having a static equilibrium position when its center of gravity is directly below the pivot axis, or pivot point. Also, for a given weight and pivot position relationship there is a sensitivity of object tilt for an incremental disturbing torque about the pivot point. This sensitivity is inversely related to the distance between the pivot point and the center of gravity of the weight.

This invention applies these principles in a unique and novel manner to make a light weight and simple device with a pivot point that is adjustable with respect to the wheel center of gravity for the purpose of adjusting the sensitivity of balancing the subject wheel to the degree of balance desired for satisfactory highway use. The adjusting the balance of the wheel is accomplished by setting weights in positions around the wheel while supporting the wheel on the balancing point of this device until the desired degree of balance perfection is shown by the horizontal attitude of the wheel.

The sole FIGURE of the drawing is a cross-sectional view of one embodiment of the invention.

The subject device, sketched in the FIGURE, has a means of establishing a pivot point 1, which is the center of curvature of the rounded lower end of an adjustable balancing rod 2, shown in FIG. 1 as a screw, on the axis of the tire and wheel assembly 3, and this device also has the novel means of adjusting this pivot point along the wheel axis to control the relation of the pivot point to the center of gravity 4 of the assembly of tire, wheel and balancing device. This adjustment is provided since the position of the center of gravity of the assembly is not known before balancing the wheel, both along the axis and radially from the axis. The balancing rod is adjustably attached to a mounting plate 5 by external screw threads on it and internal mating screw threads in the hub portion of the mounting plate. The mounting plate is constructed to have a singular position of assembly with the wheel to place the balancing rod on the same axis of the wheel as when the wheel is mounted on a vehicle in operation. In FIG. 1 this is shown as the mounting points 6, so placed on the mounting plate that when they engage the wheel stud holes the balancing rod is held on the wheel axis. This particular scheme, as shown in the sketch, is only one scheme, of the many various schemes that may be built to adapt the adjusting rod to different style wheels.

The pedestal 7 has a top plate 8 that is both leveled and adjusted in height, by adjustable legs 9, to such a height above the floor 10 that when the balancing rod is adjusted to raise the tire a distance above the floor, the center of gravity of the assembly is still below the pivot point center of curvature 1, but close enough to the pivot point to give the desired balancing sensitivity. Adjusting this spacing between the center of gravity and the pivot point does give enough control of the sensitivity of balancing the assembly to enable the balancing of the majority of automotive wheels and tires to a well enough balanced condition for smooth riding on a good highway, which is a purpose of this device. When the tire and wheel are placed flat on the floor above the pedestal the space in the wheel cavity between the top of the pedestal and the bottom of the mounting plate is great enough to allow the adjusting rod to be drawn away from the pedestal with sufficient clearance to avoid the pivot point striking the pedestal when the tire and wheel, with balancer attached, is lowered down onto, or raised up from, the floor around the pedestal. By this design feature damage to the sensitive parts of the device are avoided. When the wheel is placed down over the pedestal an adjustment of their relative positions is made to have the balancing rod above the pedestal's leveled working face; then the rod is lowered until the wheel is raised above the floor to the height of proper sensitivity for good balancing with the customary wheel balancing weights.

The total weight of the balancing rod, mounting plate and all necessary attaching clamps such as 11, is low enough to allow a mechanic to use one hand to place the balancer in the proper position within the wheel while he holds the wheel in an on-edge position and to reach around the wheel with the other hand to set the clamps. The wheel may then be laid flat on the floor above the pedestal for balancing.

An aid for determining when the wheel is balanced in a horizontal position, such as a level vial 12, may be mounted upon the mounting plate.

The following claims are made as improvements and advances over presently known balancing devices:

1. Mechanism for balancing a wheel of a type having a rim and a mounting flange offset towards one side of said wheel to define a wheel cavity at the opposite side of the wheel, said mechanism comprising:
    a support plate;
    a balancing rod carried by said support plate, said rod having a supporting end portion;
    means for mounting said support plate onto the mounting flange of a wheel to be balanced with the axis thereof substantially coincident with the rotational axis of such wheel, and with the supporting end portion thereof projecting into the wheel cavity; and
    means for adjusting said balancing rod endwise, enabling it to be retracted an amount sufficient so that a wheel to which the support plate has been attached can be laid down onto its side over a support surface, with its wheel cavity directed downwardly, and said supporting end portion will be spaced above and out of contact with said support surface, and enabling said balancing rod to then be extended into contact with its support surface an amount sufficient to raise the wheel up onto the balancing rod, to be supported thereby.

2. Mechanism of claim 1, wherein said means for adjusting said balancing rod comprises external threads on an intermediate portion of said balancing rod and complementary internal threads carried by a hub portion of the support plate, and wherein said balancing rod includes a handle located on the side of the support plate opposite the supporting end portion of said balancing rod, said handle being usable for rotating the rod to enable said threads to move the rod endwise.

3. Mechanism according to claim 1, wherein said support plate includes a plurality of mounting points engageable in wheel stud holes in the mounting flange of the wheel, for the purpose of centering such support plate relative to the rotational axis of the wheel, and means for locking said support plate onto said mounting flange.

4. Mechanism according to claim 1, further including a support pedestal to be positioned on a floor or ground surface, said pedestal being of such a size that it is received within the wheel cavity of a wheel to which the plate is attached when said wheel is laid on its side over said pedestal, said pedestal including an upper portion presenting the said support surface for the balancing rod.

5. The mechanism of claim 4, wherein the supporting end portion of the balancing rod includes a convex end surface, the support surface on said pedestal is substantially flat, and the pedestal includes adjustable support means provided so that said support surface can be substantially level by operator adjustment of said support means.

* * * * *